United States Patent
Lee (10) Patent No.: US 7,400,890 B2
(45) Date of Patent: Jul. 15, 2008

(54) METHOD FOR DECISION OF TIME DELAY BY REPEATER IN MOBILE COMMUNICATION NETWORK

(75) Inventor: Young-Sik Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 560 days.

(21) Appl. No.: 10/915,747

(22) Filed: Aug. 11, 2004

(65) Prior Publication Data

US 2005/0096066 A1 May 5, 2005

(30) Foreign Application Priority Data

Oct. 31, 2003 (KR) .................... 10-2003-0077065

(51) Int. Cl.
*H04Q 7/20* (2006.01)
(52) U.S. Cl. ................ 455/456.1; 455/11.1; 455/456.5; 342/464
(58) Field of Classification Search .............. 455/456.1, 455/11.1, 456.5; 342/464
See application file for complete search history.

(56) References Cited

U.S. PATENT DOCUMENTS

| | | | |
|---|---|---|---|
| 2002/0115448 A1 | 8/2002 | Amerga et al. | |
| 2002/0126046 A1* | 9/2002 | Counselman et al. | 342/464 |
| 2003/0008669 A1* | 1/2003 | Stein et al. | 455/456 |
| 2003/0162550 A1 | 8/2003 | Kuwahara et al. | |
| 2003/0190919 A1* | 10/2003 | Niemenmaa | 455/456.1 |
| 2004/0097190 A1* | 5/2004 | Durrant et al. | 455/7 |
| 2004/0219930 A1* | 11/2004 | Lin | 455/456.1 |
| 2006/0003695 A1* | 1/2006 | Kennedy et al. | 455/9 |
| 2006/0128399 A1* | 6/2006 | Duan et al. | 455/456.5 |
| 2007/0129085 A1* | 6/2007 | Kennedy, Jr. | 455/456.2 |

FOREIGN PATENT DOCUMENTS

| | | |
|---|---|---|
| KR | 10200030056705 | 7/2003 |
| KR | 1020040069230 | 8/2004 |
| KR | 1020050027835 | 3/2005 |

* cited by examiner

*Primary Examiner*—Sanh D. Phu
(74) *Attorney, Agent, or Firm*—The Farrell Law Firm, P.C.

(57) ABSTRACT

A method for determination of a repeater time delay in a mobile communication network, without affecting a correct positioning of a mobile terminal, is disclosed. The method includes the steps of determining an initial estimated position of a mobile communication terminal to be measured its position, estimating a respective distance between a serving base station and an adjacent base station and the mobile terminal using the initial estimated position, estimating a time difference of arrival of a serving base station signal and an adjacent base station signal received by the mobile terminal using the estimated distances, receiving the time difference of arrival of the serving base station signal and the adjacent base station signal measured from the mobile terminal, calculating a difference between the estimated time difference of arrival and the measured time difference of arrival, and determining the difference as a repeater time delay existing in the serving base station of the mobile terminal, if said difference is larger than a predetermined threshold value. The present invention makes it possible to estimate in advance the clock error in the terminal owing to the repeater time delay in AGPS system, so it can provide the terminal with more precise Acquisition Assistance Information (AAI). Further, such estimation of clock errors in the mobile terminal makes it possible to prevent the failure in acquisition of GPS signals that may occur due to the significant deflection error in the clock operation of the mobile terminal.

13 Claims, 5 Drawing Sheets

METHOD FOR DECISION OF TIME DELAY BY REPEATER IN MOBILE COMMUNICATION NETWORK

CLAIM OF PRIORITY

This application makes reference to, incorporates the same herein, and claims all benefits accruing under 35 U.S.C. §119 from an application entitled "Method for Determining Time Delay by Repeater in Mobile Communication Network" earlier filed in the Korean Industrial Property Office on Oct. 31, 2003 and thereby duly assigned Serial No. 2003-77065 by the Office.

BACKGROUND OF THE INVENTION

1. Field of the Invention

The present invention relates generally to a global positioning system for use in mobile communication terminals, and in particular, to a method for determining time delay by a repeater in a mobile communication network.

2. Description of the Related Art

There have been proposed several feasible systems for implementing determination of a current position of a mobile communication terminal within a mobile communication network. One of those systems, for example, would be a conventional GPS (Global Positioning System) assisted mobile communication terminal with a GPS receiver capable of receiving a GPS satellite signal used for determination of a position of the mobile terminal. Another known system may be a positioning system utilizing pilot phase difference in base station signals. Alternatively, a modified positioning system has been also proposed in the state of the art that a mobile terminal equipped with the GPS receiver is provided with a series of acquisition assistance information from a position decision server of an Assisted GPS system (AGPS) such as a Position Determination Entity (PDE), in other words, a Serving Mobile Location Center (SMLC), to thereby obtain a GPS signal for determination of position.

Among the aforementioned positioning systems, the positioning system utilizing pilot phase difference in base station signals is usually referred to as Advanced Forward Link Trilateration (AFLT) system, in which information on a time difference of arrival (TDOA) in pilot signals from base station is utilized to determine a current position of a mobile communication terminal. The AFLT positioning system may utilize a time of arrival (TOA) of a radio wave to be measured as a round trip delay (RTD) or a round trip time (RTT) in addition to the TDOA information. Alternatively, a hybrid system utilizing both of AFLT and AGPS systems has been proposed.

However, the known positioning system that utilizes such time difference of arrival (TDOA) information, that is, the pilot phase difference in the base station signals to determine a current position of a mobile communication terminal may have a drawback that the TDOA information includes a large level of bias error, due to repeaters arranged in the mobile communications system. As such, this kind of bias error will give considerable adverse effect to a determination of a position of the mobile terminal. Explaining in more detail, in situations where that a time delay is caused by repeaters in AFLT positioning system using the TDOA information, it will often make the determination of a current position of the mobile terminal substantially impossible.

Furthermore, in situations where the time delay is generated due to the repeaters in AGPS positioning system using the GPS signal, it will subsequently induce a large level of error to a clock operation in the mobile terminal kept in synchronism with a timing system in a base station of the mobile communication system. Such a clock operation error in the mobile terminal will often function to obstruct the efficient acquisition of the GPS signal in the mobile terminal using AGPS positioning system, and under the worst condition, it will sometimes make it completely impossible for the mobile terminal to receive the GPS satellite signals even in an open sky environment.

With a view to solving the aforementioned problems caused by those time delays from the repeaters in the mobile communication system, one solution has been proposed in the art in which information on those repeaters arranged in the mobile communication system is organized and utilized as a set of database. That is to say, the position decision server in AGPS positioning system, such as PDE, will retain the coordinate values of the repeaters and the time delay information of each repeater as a set of database information, so that the information is utilized for decision of a position or generation of acquisition assistance information. However, this database system has a disadvantage, it will be very difficult to organize the variety of information relative to a large number of repeaters in the mobile communication network into a set of database in most efficient manner. Furthermore, the database system still has more problems in that whenever a request for decision of a position from the mobile terminal is made, the position decision server needs to search the database for information on repeaters, and that it usually requires additional cost and time to periodically update and maintain the database on repeater information in the mobile communication network.

In the meantime, in the AGPS system in which acquisition assistance information data are received from the position decision server, a modified solution that a fixed repeater time delay is also taken into account in addition to the acquisition assistance information data has been proposed in order to prevent acquisition of the GPS satellite signals owing to the time delay caused in those repeaters from failure. This solution with consideration of such a fixed repeater time delay may at least or partially compensate for the time delay problem as mentioned above, however it still fails to overcome a disadvantage that a time duration (Time To First Fix, hereinafter referred to as "TTFF) required for acquisition of the GPS satellite signal increases as the fixed repeater time delay in AGPS system. As a result, such an increase in TTFF by fixation of the repeater time delay subsequently causes the repeater time delay to be fixed with a smaller value with a view to preventing the increase in TTFF, which may eventually lead to a total failure in acquisition of the GPS satellite signal for a mobile communication terminal using AGPS positioning system.

SUMMARY OF THE INVENTION

It is, therefore, an object of the present invention to provide a method for determination of a repeater time delay in a mobile communication network, so as not to affect a precise positioning for a mobile terminal.

It is another object of the present invention to provide a method for determination of a repeater time delay in a mobile communication network, so as to prevent incorrect positioning of a mobile terminal owing to the repeater time delay, whereby according to the method the mobile terminal makes a judgment on existence of any repeater time delay in the mobile communication network, through analysis of measurable base station signals, and then makes a decision to the repeater time delay value.

To achieve the above and other objects of the present invention, there is provided a method for determination of a repeater time delay in a mobile communication network, including determining an initial estimated position of a mobile communication terminal whose position is to be measured; estimating a respective distance between a serving base station and an adjacent base station and the mobile terminal using the initial estimated position; estimating a time difference of arrival of a serving base station signal and an adjacent base station signal received by the mobile terminal using the estimated distances; receiving the time difference of arrival of the serving base station signal and the adjacent base station signal actually measured from the mobile terminal; calculating a difference between the estimated time difference of arrival and the measured time difference of arrival; and determining the difference as a repeater time delay existing in the serving base station of the mobile terminal, if said difference is larger than a predetermined threshold value.

According to a second aspect of the present invention, there is provided a method for determination of a repeater time delay in a mobile communication network, including estimating an arrival time difference in a serving base station signal and an adjacent base station signal of a mobile communication terminal whose position is to be measured, and then calculating a time delay owing to a repeater in the serving base station using the estimated arrival time difference and a measured arrival time difference in the serving base station signal and the adjacent base station signal actually measured by the mobile communication terminal; and if a resultant value of a difference between the measured time difference of arrival and the estimated time difference of arrival, plus the calculated time delay by the serving base station repeater is larger than a predetermined first threshold value, then determining the resultant value as a repeater time delay of the associated adjacent base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described hereinafter with reference to the accompanying drawings. In the following description, well-known functions or constructions are not described in detail since they would obscure the invention in unnecessary detail and like reference numerals are intended to represent like components. Furthermore, although many particular details such as circuit components or blocks are to be shown in the following description, they are provided for a better understanding of the invention to the reader by way of example only, but not limited to those details disclosed herein.

An Assisted Global Positioning System (AGPS) according to a preferred embodiment of the present invention will function to (1) determine whether there exists a repeater time delay that may cause a problem when of a position of a mobile communication terminal is determined, and (2) subsequently, to make a calculation of the repeater time delay once such a time delay is generated in an associated base station.

Figure 1:
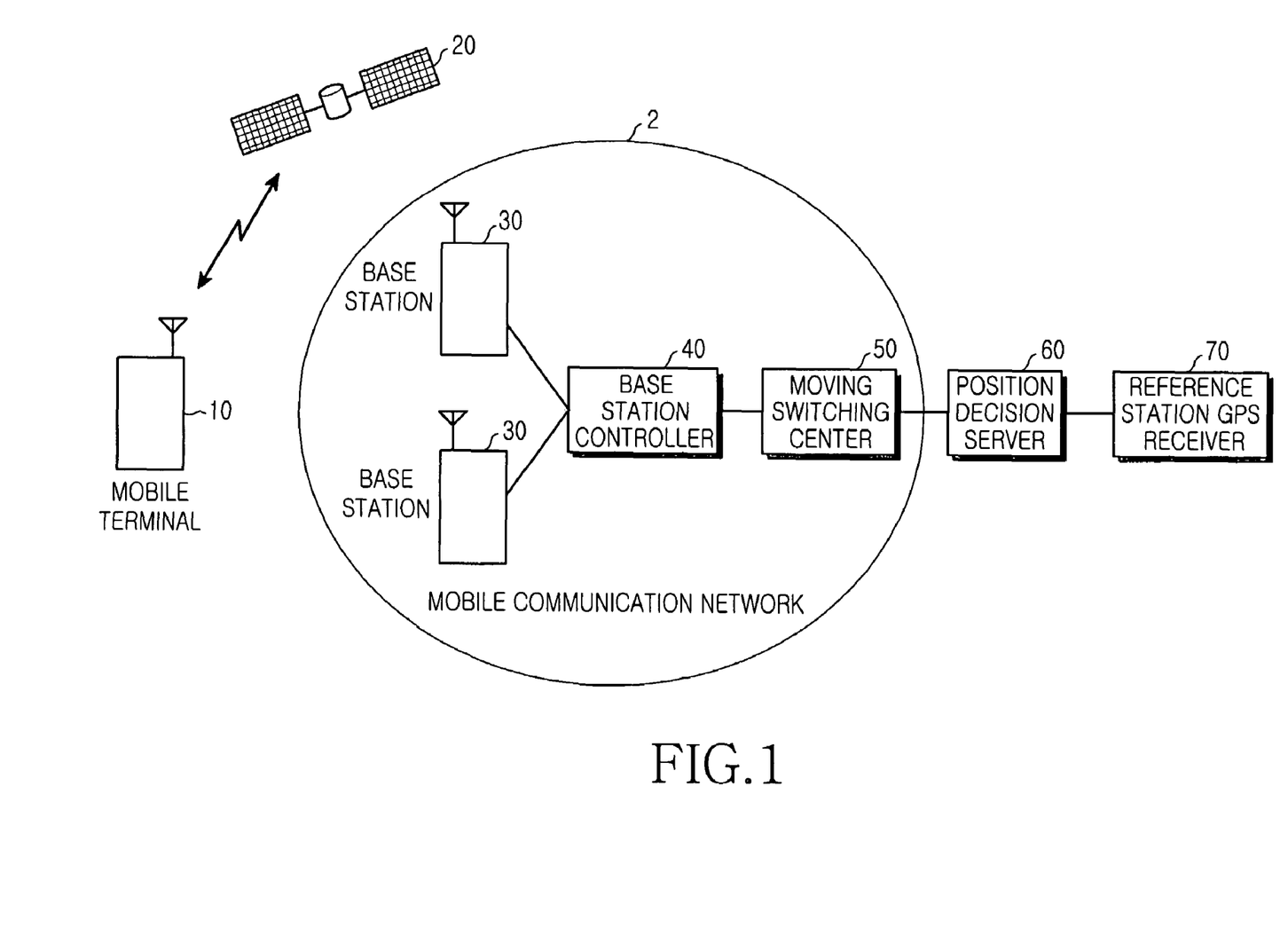
FIG. 1 is a block diagram of the overall system configuration in an AGPS system, including a mobile communication network, according to a preferred embodiment of the present invention.

Referring now to FIG. 1, description is made of a block diagram of the overall system configuration in the AGPS system, including a conventional mobile communication network, according to a preferred embodiment of the present invention. The AGPS system includes a mobile communication terminal 10, a GPS satellite 20, a mobile communication network 2, a position decision server 60, and a reference station GPS receiver 70.

The mobile terminal 10 is equipped with a GPS receiver for receiving a GPS signal from the GPS satellite 20, so that the mobile terminal 10 can be coupled to the position decision server 60 via the mobile communication network 2. In this particular embodiment of the invention, the mobile communication network 2 may include a base station 30, a base station controller 40 and a moving switching station 50. The mobile terminal 10 usually makes a measurement of a base station signal and performs wireless communication with the base station 30, so that it could be consequently connected with the position decision server 60 via the base station controller 40 and moving switching station 50.

The position decision server 60 is generally equipped with a reference station GPS receiver 70 for receiving a base station measurement signal from the mobile terminal 10 and then determine an initial position of the terminal utilizing the base station measurement signal, thereby providing the mobile terminal with acquisition assistance information. According to the preferred embodiment of the present invention, the position decision server 60 operates to determine as to whether there exists a repeater in the base station 30 using the initial position of the mobile terminal. The repeater may cause a time delay when a current position of the mobile terminal is determined. Subsequently, the position decision server 60 makes a calculation of the repeater time delay once it is determined that such a time delay has been generated in the associated base station.

The mobile terminal 10 utilizes the GPS signal from the GPS satellite 20 and the acquisition assistance information from the position decision server 60, for estimating a GPS pseudo distance information that is to be provided to the position decision server 60. Using the GPS pseudo distance information from the mobile terminal 10 and the satellite information (ephemeris) of the GPS satellite received by the reference station GPS receiver 70, the position decision server 60 calculates a current position of the mobile terminal. In more detail, the position decision server 60 calculates a position of the satellite at the timing point that the mobile terminal 10 effected an estimation to the GPS pseudo distance information using the GPS pseudo distance information and the satellite information of the GPS satellite. The position decision server 60 then calculate a current position of the mobile terminal using the position of the satellite and the pseudo distance information estimated by the terminal. Consequently, the position decision server 60 provides the terminal 10 with the calculated position of the terminal. At this stage of the operation, the position decision server 60 may be directed not to provide the mobile terminal 10 with the calculated position of the terminal.

According to the preferred embodiment of the present invention, the position decision server 60 in the above AGPS system determines whether any repeater exists in an associated base station 30 utilizing the initial estimated position of the mobile terminal 10, and if the repeater exists, makes a calculation of a repeater time delay. The calculated time delay is used to solve the problems caused by the repeater time delay. That is to say, for instance, a clocking error in the mobile terminal 10 caused by the repeater time delay can be estimated in the AGPS system, thereby enabling better reception of the GPS satellite signal to better determine the position of the mobile terminal.

Figure 2:
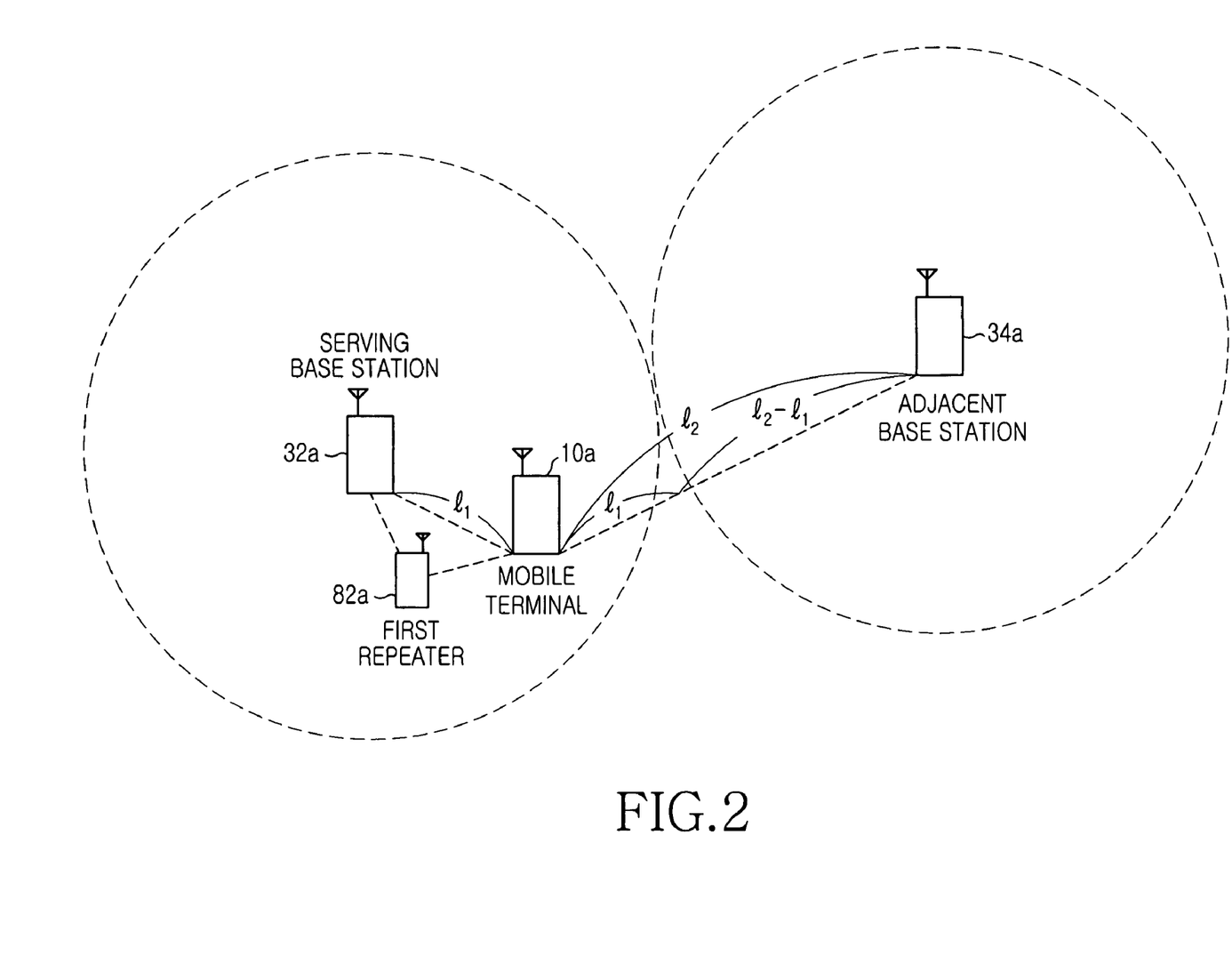
FIG. 2 is a block diagram showing an abbreviated systematic configuration in a situation where at least one repeater is positioned within a cell area of a serving base station in an AGPS system according to a preferred embodiment of the present invention.

FIG. 2 shows a system configuration, where at least one repeater is positioned within a cell area of a serving base station in the AGPS system according to the preferred embodiment of the present invention. Referring now FIG. 2, the serving base station 32a has a first repeater 82a. The mobile terminal 10 is located within a cell area covered by the serving base station 32a, and communicates with the serving base station via the first repeater 82a. Another adjacent base station 34a is configured to cover a cell area adjacent to the cell area covered by the serving base station 32a. According to the preferred embodiment of the present invention, as described heretofore, the position decision server 60 can determine whether there occurs any time delay due to the first repeater 32a where the first repeater 82a is included in the serving base station 32a. Subsequently, the position decision server 60 can make a calculation of the repeater time delay once it has been determined that such a time delay was actually generated in the serving base station.

Figure 3:
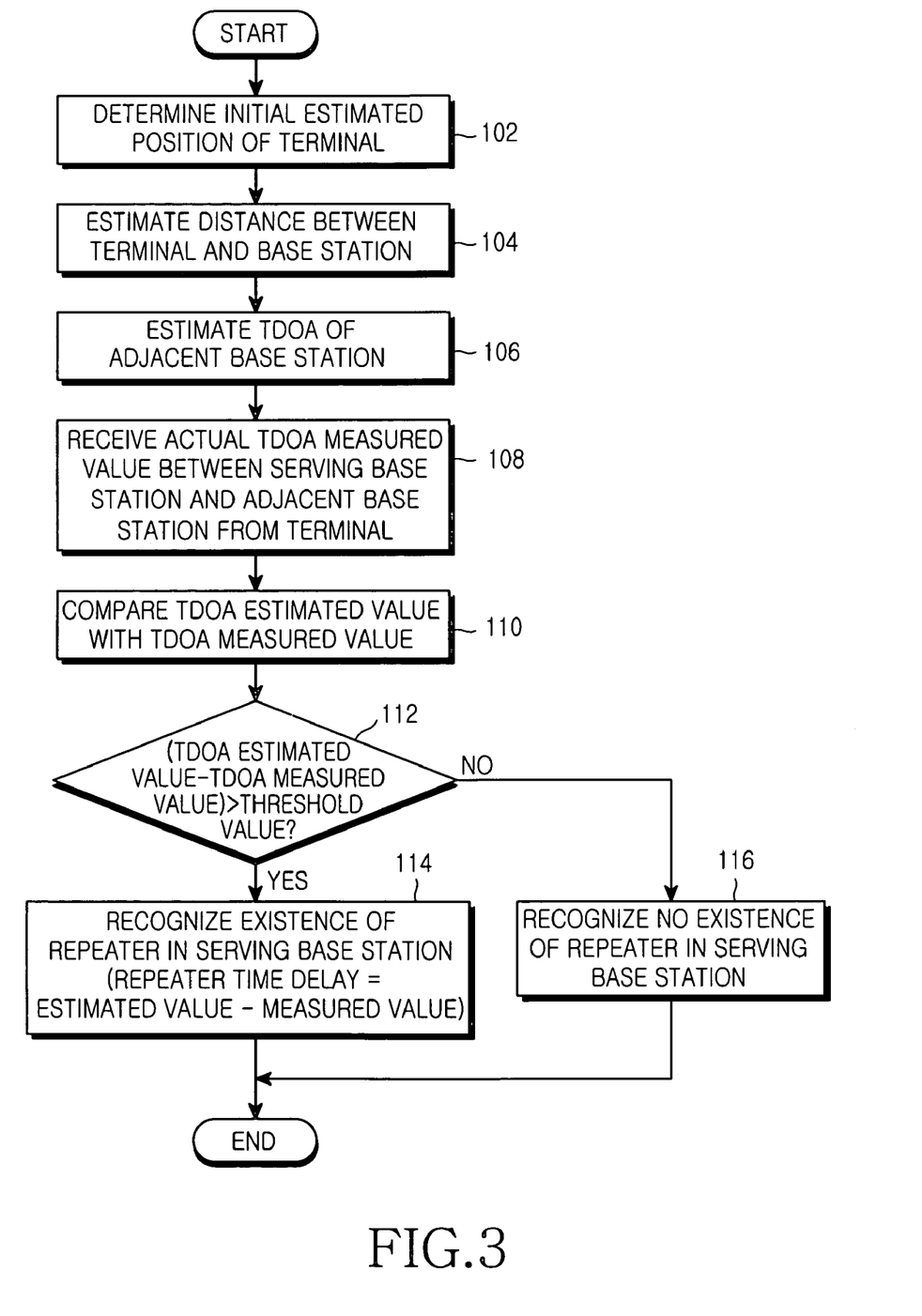
FIG. 3 is a flow chart illustrating, by way of example, the steps for making a decision as to existence of a repeater in the serving base station and for estimating a repeater delay time in relation to the AGPS system according to a preferred embodiment of the present invention.

FIG. 3 shows a flow chart illustrating, by way of example, the steps for determining whether there exists any time delay caused by the first repeater 82a in the serving base station 32a. The flowchart also illustrates making an estimation of the repeater delay time in relation to the AGPS system according to the preferred embodiment of the present invention. It will now be described in further detail, referring to FIGS. 1 to 3, the procedure in the position decision server 60 for determining whether there exists any time delay caused the first repeater 82a in the serving base station 32a, in relation to the AGPS system, and making an estimation of the repeater delay time caused, provided that the first repeater 82a exists within a cell area of the serving base station 32a.

The position decision server 60 determines an initial estimated position of the mobile terminal 10a in step 102. It should be appreciated that several different solutions may be used to determine an initial estimated position of the mobile terminal 10a by the position decision server 60. The first solution is to determine a coordinate value of a sector center position of the serving base station 32a as the initial estimated position of the mobile terminal 10a. The second solution is to determine average coordinates of the sector center positions in at least two base stations capable of receiving signals in the mobile terminal 10a as the initial estimated position. The third solution is to determine the initial estimated position using the average value of the coordinates of base stations capable of receiving signals in the mobile terminal 10a. The fourth solution is to determine the initial estimated position using pilot signals of the base stations capable of signal receiving by the mobile terminal 10a. Finally, the fifth solution is to determine the initial estimated position using a round trip delay (RTD) or a round trip time (RTT) and pilot signals of the base stations received by the mobile terminal 10a.

The position decision server 60 obtains a positional coordinate value of the terminal 10a to thereby determine the initial estimated position, and then proceeds to step 104 to estimate a distance between the terminal 10a and the base stations 32a and 34a. That is, the position decision server 60 uses the positional coordinate values of the terminal 10a and the serving base station 32a to estimate a distance $l_1$ between the terminal 10a and the base stations 32a and it uses the positional coordinate values of the terminal 10 and an adjacent base station 34a to estimate a distance $l_2$ between the terminal 10 and the base stations 34a. In step 106 the position decision server 60 uses the difference of these two distances, that is, $l_2-l_1$ to estimate the time difference of arrival (TDOA) between the serving base stations 32a and the adjacent base station 34a. Hence, it means that the position decision server 60 utilizes the distance estimated by means of the initial positional coordinate of the terminal 10, between the terminal 10 and the base stations 32a and 34a, to obtain a TDOA estimated value ($k_1$) between the serving base stations 32a and the adjacent base station 34a. Here, the estimated TDOA value ($k_1$) is an estimated value of the TDOA between the serving base stations 32a and thee adjacent base station 34a to be practically measured using the distance only between the base stations 32a and 34a.

As described heretofore, after obtaining the estimated TDOA value ($k_1$) between the serving base stations 32a and the adjacent base station 34a, the position decision server 60 receives, in step 108, an actually measured TDOA value ($k_2$) between the serving base stations 32a and the adjacent base station 34a from the terminal 10. Here, the TDOA measured value ($k_2$) will be a value measured to determine how many PN (Pseudo Noise) codes of signals in the adjacent base station 34a are shifted than PN codes of signals in the serving base station 32a through to the terminal 10 while keeping the mobile terminal 10a in synchronism with the serving base stations 32a.

As such, after the position decision server 60 has obtained the estimated TDOA value ($k_1$) and received the actual TDOA measured value ($k_2$) between the serving base stations 32a and the adjacent base station 34a from the terminal 10, the position decision server compares the estimated TDOA value ($k_1$) with the actual TDOA measured value ($k_2$), in step 110. Then, the position decision server 60 determines whether or not the difference between the estimated TDOA value ($k_1$) and the actually measured TDOA value ($k_2$), that is, ($k_1-k_2$), is more than a threshold value, wherein the threshold value is defined as a maximum value of a general error that may occur upon measurement of the actual TDOA value. For example, this threshold value can be determined practically taking into account the various aspects of errors such as an error in initial estimated position of a mobile terminal, Non Line Of Sight (NLOS) error, multi-path error, error in measurement, etc., and advantageously, the value may be of about 5-chip level (approximately 1.22 km) in Code Division Multiple Access (CDMA) chip unit.

In case that there exists no repeater in the serving base station 32a, the TDOA measured value ($k_2$) that the terminal 10a actually measured between the serving base stations 32a and the adjacent base station 34a is measured in a similar manner to the TDOA estimated value ($k_1$) anticipated in advance using the distance. Accordingly, the difference ($k_1-k_2$) between the estimated TDOA value and the measured TDOA value will become quite small, thereby being less than the threshold value.

In a situation where the first repeater 82*a* exists in the serving base station 32*a*, as shown in FIG. 2, the TDOA measured value ($k_2$) that the terminal 10*a* has actually measured between the serving base stations 32*a* and the adjacent base station 34*a* will be represented as a value smaller than the TDOA estimated value ($k_1$). This is because the signal of serving base station received by the mobile terminal 10*a* is made to delay by a repeater time delay ($k_3$) owing to the first repeater 82*a*. Once the signal of the serving base station 32*a* received by the mobile terminal 10*a* is delayed by the repeater time delay ($k_3$) owing to the first repeater 82*a*, the mobile terminal 10*a* is directed to measure how much the PN code of the signal from the adjacent base station 34*a* signal is delayed having reference to the PN code of the signal from the serving base station 32*a* delayed by the repeater time delay ($k_3$) owing to the first repeater 82*a*. Hence, the TDOA measured value ($k_2$) taken in existence of the repeater in the serving base station 32*a* has a value smaller than that of non-existence of the repeater in the serving base station 32*a*. Accordingly, it will be apparent that when the repeater exists in the serving base station 32*a*, the TDOA measured value ($k_2$) taken by the terminal between the serving base stations 32*a* and the adjacent base station 34*a* becomes smaller than the TDOA estimated value ($k_1$).

According to the above-mentioned principles of operation, the position decision server 60, in step 114, acknowledges that there exists a repeater in the serving base station 32*a*, only if the difference ($k_1-k_2$) between the estimated TDOA value and the measured TDOA value is larger than the threshold value. The position decision server 60 then determines the difference value ($k_1-k_2$) as the repeater time delay ($k_3$) owing to the first repeater 82*a*. In step 116 the position decision server 60 is acknowledges that no repeater exists in the serving base station 32*a*, if the TDOA estimated value ($k_1$) is not larger than the TDOA measured value ($k_2$).

In the above embodiment of the present invention, the description was made to a system configuration implemented with a single adjacent base station 34*a*, however it should be understood that a general mobile communication system includes a plurality of adjacent base stations. Thus, in situations where a multiplicity of adjacent base stations exist in the mobile communication network, the position decision server 60 obtains the difference values ($k_1-k_2$) between the estimated TDOA values and the measured TDOA values and determine the largest of those difference values larger than the threshold value, as the repeater time delay in the serving base station.

Figure 4:
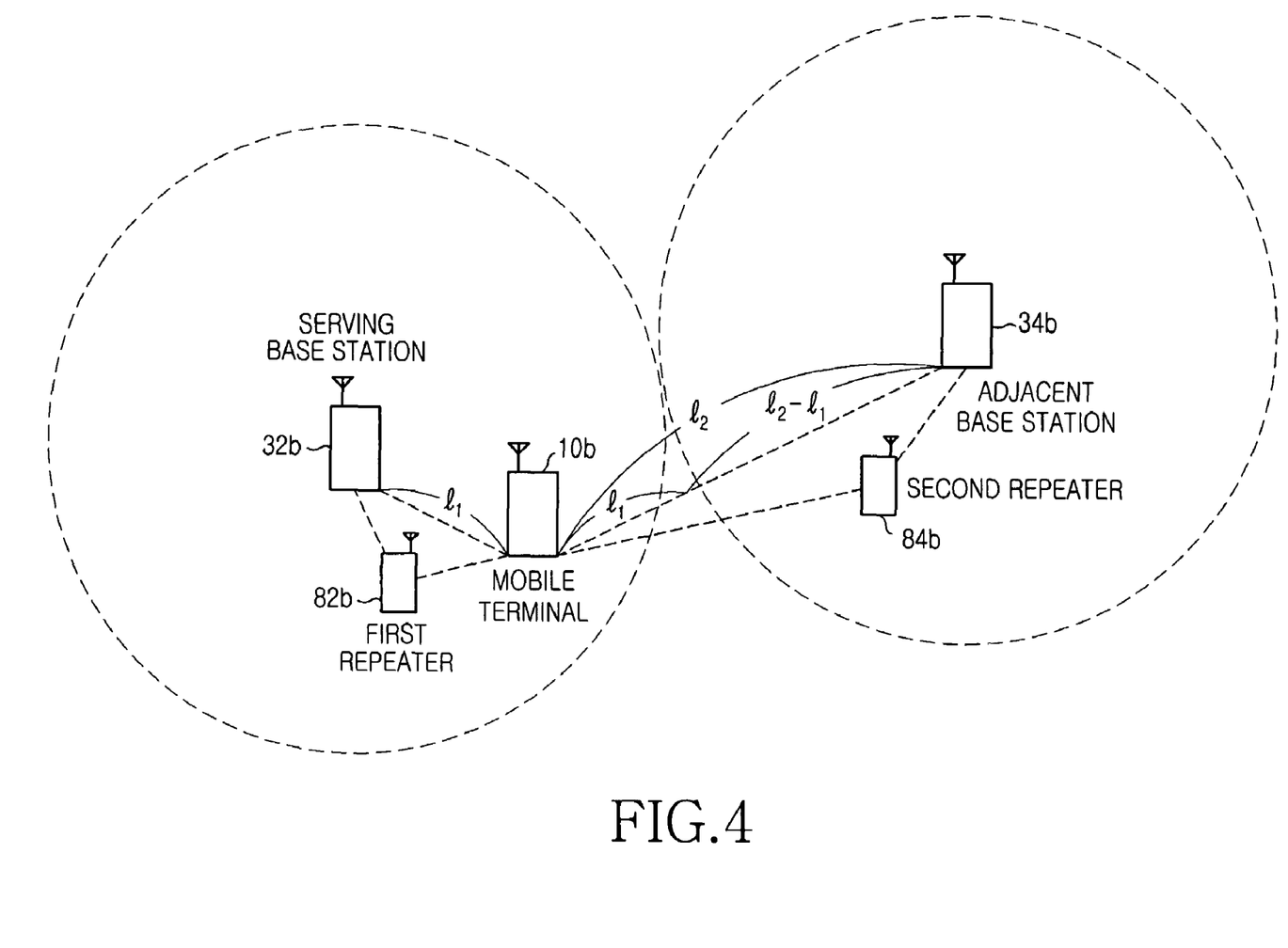
FIG. 4 is a block diagram showing an abbreviated systematic configuration in case where a repeater is respectively positioned within each cell area of a serving base station and an adjacent base station in an AGPS system according to a preferred embodiment of the present invention.

FIG. 4 shows an abbreviated system configuration where a repeater is respectively positioned within each cell area of the serving base station and its adjacent base station in the AGPS system according to the preferred embodiment of the present invention. Referring now to FIG. 4, the serving base station 32*a* includes a first repeater 82*b*. The mobile terminal 10*b* is located within a cell area covered by the serving base station 32*b*, and communicates with the serving base station via the first repeater 82*b*. Another adjacent base station 34*b* having a second repeater 84*b* is configured to cover a cell area adjacent to the cell area covered by the serving base station 32*b*. Therefore, according to the preferred embodiment of the present invention, the position decision server 60 makes it possible to determine whether any time delay was caused due to the second repeater 84*b* even where the second repeater 84*b* exists in the adjacent base station 34*b*. Subsequently, the position decision server 60 makes a calculation to such a repeater time delay owing to the second repeater 84*b*.

Figure 5:
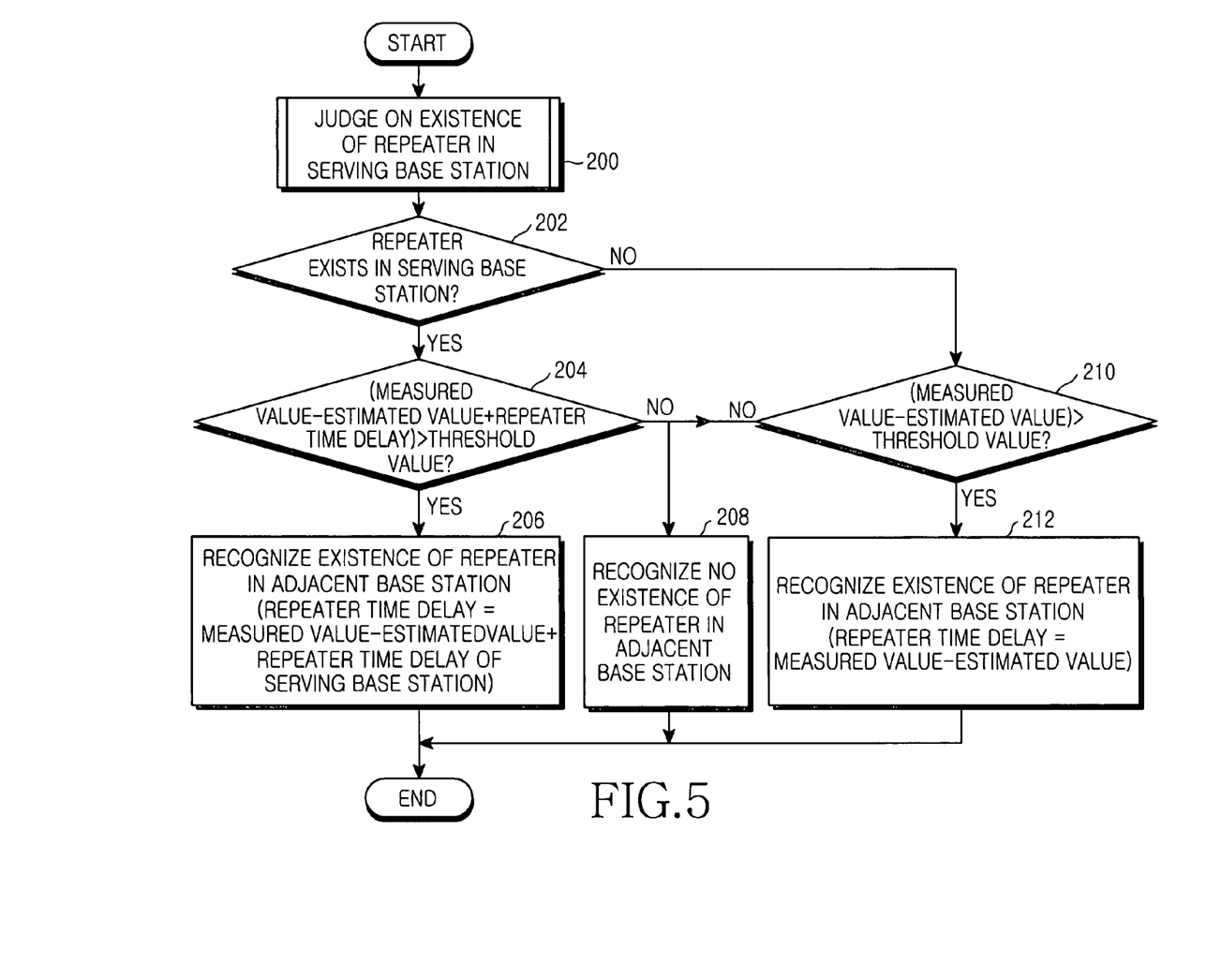
FIG. 5 is a flow chart illustrating, as is shown in FIG. 3, the steps for making a decision as to existence of a repeater in the adjacent base station and for estimating a repeater delay time in relation to the AGPS system according to a preferred embodiment of the present invention.

FIG. 5 shows a flow chart illustrating the steps for making a decision about the existence of a repeater in the adjacent base station and for estimating the repeater delay time in relation to the AGPS system according to the preferred embodiment of the present invention. Referring now to FIGS. 1, 4 and 5, a detailed description is made regarding the position decision server 60 determining whether or not any time delay has occurred owing to the second repeater 84*b*. If the second repeater 84*b* exists in a cell area of the adjacent base station 34*b* in the AGPS system, and calculating the repeater delay time.

In step 200, the position decision server 60 determines whether there exists any repeater in the serving base station 32*b*. The position decision server 60 determines the initial estimated position of the terminal 10*b* to obtain the TDOA estimated value ($k_1$) of the adjacent base station, and then receives the actual TDOA measured value ($k_2$) of the adjacent base station 34*a*. Subsequently, the position decision server makes a judgment as to whether the difference, i.e., ($k_1-k_2$), between the TDOA estimated value ($k_1$) and the actual TDOA measured value ($k_2$), is larger than the threshold value. Here, the occasion that the difference ($k_1-k_2$) is larger than the threshold value means that there exists at least one repeater in the serving base station 32*a*. If the difference ($k_1-k_2$) is not larger than the threshold value, means that no repeater exists in the serving base station 32*a*. This procedure would be substantially identical to those described in the above steps 102 to 112 of FIG. 3, so further detailed description regarding these steps will be omitted for the sake of convenience.

After the position decision server 60 determines in step 202 whether any repeater exists in the serving base station 32*b*, it proceeds to step 204 if it is determined that the repeater exists in the serving base station 32*b*. Thus, the position decision server 60 determines in the step 204 whether a sum of {TDOA Measured Value ($k_2$)−TDOA Estimated Value ($k_1$)+Repeater Time Delay ($k_3$) of Serving Base Station} is more than the threshold value if any repeater exists in the serving base station 32*b*.

The TDOA estimated value ($k_1$) is a value of estimation to TDOA of the serving base station 32*a* and adjacent base station 34*a* using the distance only in between the terminal 10*b* and these base stations 32*a* and 34*a*, without taking into account existence of the repeaters in the serving base station 32*a*. Therefore, the additional time delays ($k_3$ and $k_4$) owing to the repeaters provided in the serving base station 32*b* and adjacent base station 34*b* would not be considered into the TDOA estimated value ($k_1$), even though repeaters exist in the serving base station 32*b* or the adjacent base station 34*b*.

In contradistinction, the TDOA measured value ($k_2$) is a value that the terminal 10*b* has actually measured to determine how much larger the PN code of signals of the adjacent base station 34*b* is shifted compared to PN code of signals of the serving base station 32*b* while keeping the terminal 10*b* in synchronization with the serving base station 32*b*. Therefore, if repeaters exist in the serving base station 32*b* or the adjacent base station 34*b*, the time delays ($k_3$ and $k_4$) owing to the repeaters provided in the serving base station 32*b* or the adjacent base station 34*b* will be included in the TDOA measured value ($k_2$).

Accordingly, when the repeater exists in the serving base station 32*b*, the actual TDOA measured value ($k_2$) in between the serving base station 32*b* and the adjacent base station 34*b* decreases by the repeater time delay ($k_3$) owing to the repeater 82*b* provided in the serving base station. As a result, the TDOA measured value ($k_2$) between the serving base station 32a and the adjacent base station 34a is measured similarly to the value of {TDOA Estimated Value ($k_1$)–Repeater Time Delay ($k_3$) of Serving Base Station}, and the value in a sum of {TDOA Measured Value ($k_2$)–TDOA Estimated Value ($k_1$)–Repeater Time Delay ($k_3$) of Serving Base Station} becomes very small. In summary, if there exists the repeater in the serving base station 32b, the value of {TDOA Measured Value ($k_2$)–TDOA Estimated Value ($k_1$)+Repeater Time Delay ($k_3$) of Serving Base Station} becomes much smaller than the threshold value.

If the repeaters exist the adjacent base station 34b as well as in the serving base station 32b, as shown in FIG. 4, then the actual TDOA measured value ($k_2$) will be measured for a value larger than the value of {TDOA Estimated Value ($k_1$) b–Repeater Time Delay ($k_3$) of Serving Base Station}. This is because the repeater time delay ($k_3$) owing to the second repeater 84b provided in the adjacent base station 34b is incorporated in the actual TDOA measured value ($k_2$). Here, the value of {TDOA Measured Value ($k_2$)–TDOA Estimated Value ($k_1$)–Repeater Time Delay ($k_3$) of Serving Base Station}, that is to say, the value {TDOA Measured Value ($k_2$)–TDOA Estimated Value ($k_1$)+Serving Repeater Time Delay ($k_3$)} will correspond to the repeater time delay ($k_4$) owing to the second repeater 84b.

Following the above sequence of controls, the position decision server 60 then proceeds to step 206 to recognize the existence of the repeater 84b in the adjacent base station 34b, if the value of {TDOA Measured Value ($k_2$)–TDOA Estimated Value ($k_1$)+Repeater Time Delay ($k_3$) of Serving Base Station} is larger than a predetermined threshold value. Hence, the position decision server 60 determines the value of {TDOA Measured Value ($k_2$) minus TDOA Estimated Value ($k_1$) plus the Repeater Time Delay ($k_3$) of Serving Base Station} as the repeater time delay ($k_4$) in the adjacent base station 34b. In the meantime, the position decision server 60 then proceeds to step 208 to determine that there exists no repeater in the adjacent base station 34b, if the value of {TDOA Measured Value ($k_2$)–TDOA Estimated Value ($k_1$)+ Repeater Time Delay ($k_3$) of Serving Base Station} is not larger than the threshold value.

Subsequently, once the position decision server 60 has determined that no repeater exists in the serving base station 32b, it proceeds to step 210 to determine whether the value of {TDOA Measured Value ($k_2$) minus TDOA Estimated Value ($k_1$)} is more than the threshold value or not. Then, if it is determined that the value of {TDOA Measured Value ($k_2$) minus TDOA Estimated Value ($k_1$)} in the adjacent base station 34b is no more than the threshold, the position decision server 60 proceeds back to step 208 to determine that there exists no repeater in the adjacent base station 34b. In a similar way of controls, if the value of {TDOA Measured Value ($k_2$) minus TDOA Estimated Value ($k_1$)} in the adjacent base station 34b is larger than the threshold, the position decision server 60 proceeds to step 212 to determine that there exists the repeater in the adjacent base station 34b. Thus, the position decision server 60 operates to determine the difference between the TDOA measured value ($k_2$) and the TDOA estimated value ($k_1$) as the repeater time delay ($k_4$) in the adjacent base station 34b.

As understood from the foregoing description, the present invention makes it possible to determine whether there exists a repeater time delay in base station area, which may cause a significant problem when a position of a mobile communication terminal in the AGPS system is determined and subsequently, to make a calculation of the repeater time delay once such a repeater time delay is generated in the associated base station. Therefore, the present invention will greatly contribute to overcoming the problem caused due to the repeater time delay in the AGPS system. That is, the present invention makes it possible to estimate in advance the clock error in the mobile communication terminal owing to the repeater time delay in a conventional AGPS system, so that the position decision server 60 can provide the terminal with more correct Acquisition Assistance Information (AAI).

Further, according to the present invention, such estimation of clock errors in the mobile terminal in use makes it possible to prevent the failure in acquisition of GPS signals that may occur due to the significant deflection error in the clock operation of the mobile terminal. Moreover, the present invention makes it possible to reduce the positional error by calculating the repeater time delay included in the measured value, the position of the mobile terminal is determined using TDOA or TOA measurements. The present invention can make a determination as to existence of the repeater using only the signal characteristic of the pilot phase difference, without the use of any additional equipment, and makes a calculation on the repeater time delay due to those repeaters, thereby making it possible to implement the positioning system in the mobile communication terminal using the conventional mobile network.

While the present invention has been shown and described with reference to preferred embodiments thereof, it will be understood by those skilled in the art that various changes and modifications in form and details may be made therein and equivalents may be substituted for elements thereof, without departing from the spirit and scope of the invention as defined by the appended claims. For example, although in the above embodiment of the present invention the mobile communication network has been described with reference to a CDMA system, the network may be of a conventional asynchronous Wideband Code Division Multiple Access (WCDMA) system, wherein the mobile communication network such as asynchronous WCDMA system may include Node-B or a radio network controller (RNC) configured so that the terminal can wirelessly communicates with the Node-B and be connected with the position decision server via RNC.

What is claimed is:

1. A method for determining a repeater time delay of a base station in a mobile communication network, comprising the steps of:
   (i) estimating an arrival time difference in a serving base station signal and an adjacent base station signal of a mobile communication terminal to be measured its position, and then calculating a time delay caused by a repeater in the serving base station using the estimated arrival time difference and a measured arrival time difference in the serving base station signal and the adjacent base station signal measured by the mobile communication terminal; and
   (ii) if a resultant value of a difference between the measured time difference of arrival and the estimated time difference of arrival, plus the calculated time delay by the serving base station repeater is larger than a predetermined first threshold value, then determining the resultant value as a repeater time delay of the associated adjacent base station.

2. The method according to claim 1, wherein step (i) further comprises the steps of:
   (a) determining an initial estimated position of a mobile communication terminal whose position is to be measured;

(b) estimating a respective distance between a serving base station and an adjacent base station and the mobile terminal using the initial estimated position;

(c) estimating a time difference of arrival of a serving base station signal and an adjacent base station signal received by the mobile terminal using the estimated distances;

(d) receiving the time difference of arrival of the serving base station signal and the adjacent base station signal, actually measured from the mobile terminal;

(e) calculating a difference between the estimated time difference of arrival and the measured time difference of arrival; and (f) determining the difference as a repeater time delay existing in the serving base station of the mobile terminal, if said difference is larger than a predetermined second threshold value.

3. The method according to claim 2, wherein step (a) further comprises the step of determining a coordinate value of a sector center position in the serving base station as the initial estimated position.

4. The method according to claim 2, wherein step (a) further comprises the step of determining as the initial estimated position an average coordinate value of the sector center positions in a plurality of serving base stations that can be received by the mobile terminal.

5. The method according to claim 2, wherein step (a) further comprises the step of determining an average value of coordinates of the base stations that can be received by the mobile terminal as the initial estimated position.

6. The method according to claim 2, wherein step (a) further comprises the step of determining the initial estimated position using pilot phase difference of the base stations received by the mobile terminal.

7. The method according to claim 2, wherein step (a) further comprises the step of determining the initial estimated position using either one of a round trip delay (RTD) and a round trip time (RTT) and the pilot signal of the serving base station received by the mobile terminal.

8. The method according to claim 2, wherein step (b) further comprises the step of estimating a distance between the mobile terminal and the serving base station using the initial estimated position of the mobile terminal and a positional coordinate of the serving base station, and estimating a distance between the mobile terminal and the adjacent base station using the initial estimated position of the mobile terminal and a positional coordinate of the adjacent base station.

9. The method according to claim 2, wherein said second threshold value is set to the maximum value of time difference of arrival errors in the serving base station signal and the adjacent base station signal actually measured by the mobile terminal.

10. The method according to claim 2, wherein said first threshold value and said second threshold value are identical to each other.

11. The method according to claim 2, wherein said first threshold value is larger than said second threshold value.

12. The method according to claim 2, wherein said first threshold value is not larger than said second threshold value.

13. The method according to claim 1, wherein step (i) further comprises a step of determining that no repeater time delay exists in the serving base station of the mobile terminal in case that the difference is not larger than said second threshold value.

* * * * *